Jan. 24, 1939.  F. BARBER  2,144,609
VARIABLE SPEED AND MOTION TRANSMITTING MECHANISM
Filed Nov. 22, 1935    6 Sheets-Sheet 1
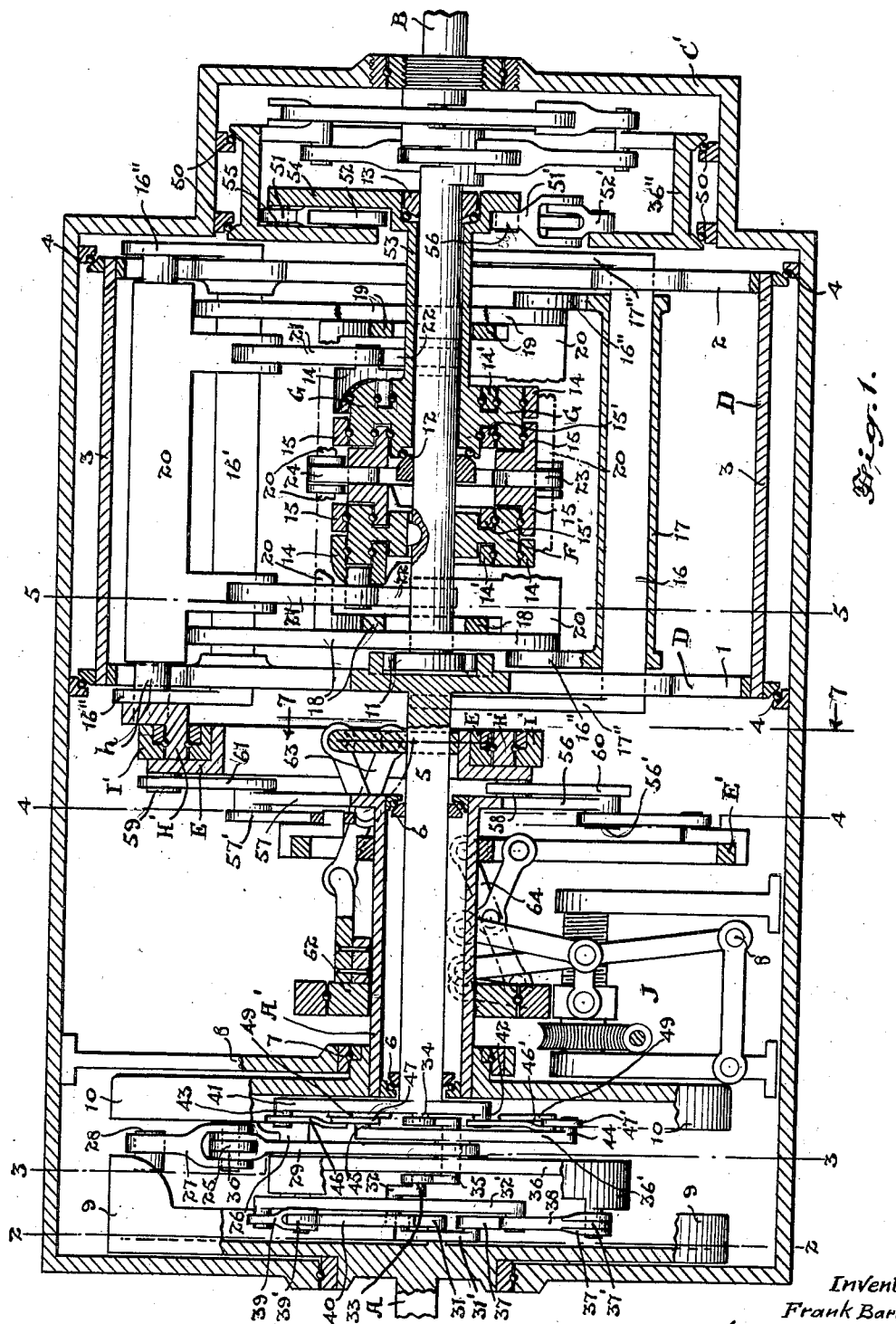
Fig. 1.
Inventor
Frank Barber
atty.

Jan. 24, 1939.　　　　F. BARBER　　　　2,144,609
VARIABLE SPEED AND MOTION TRANSMITTING MECHANISM
Filed Nov. 22, 1935　　　6 Sheets-Sheet 2

Inventor.
Frank Barber.

Inventor.
Frank Barber.

Jan. 24, 1939.  F. BARBER  2,144,609
VARIABLE SPEED AND MOTION TRANSMITTING MECHANISM
Filed Nov. 22, 1935    6 Sheets-Sheet 5

Inventor.
Frank Barber.

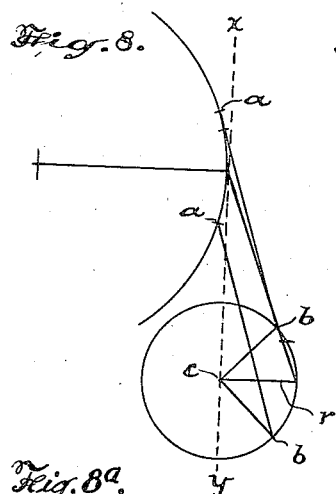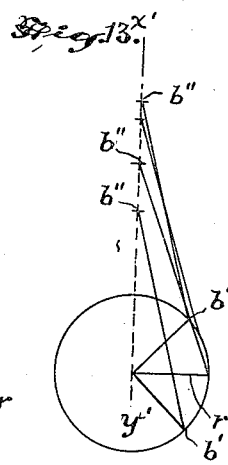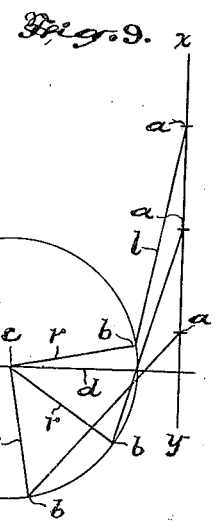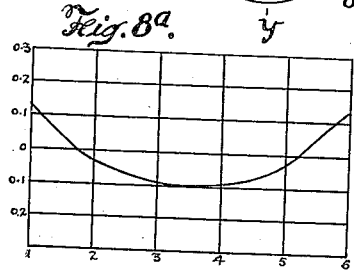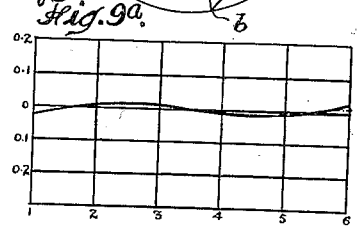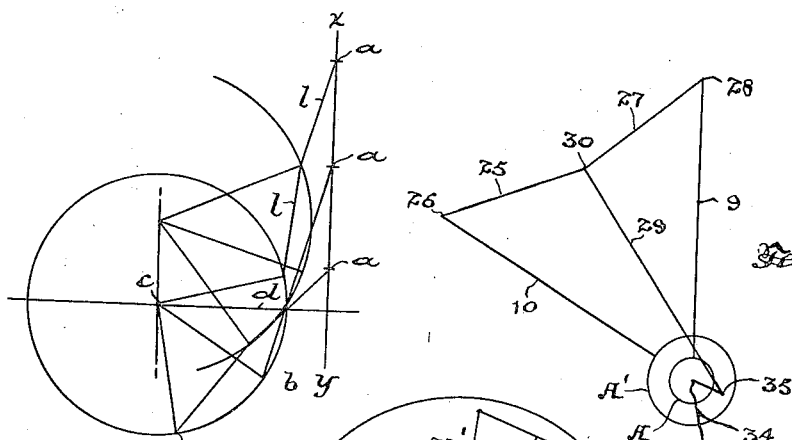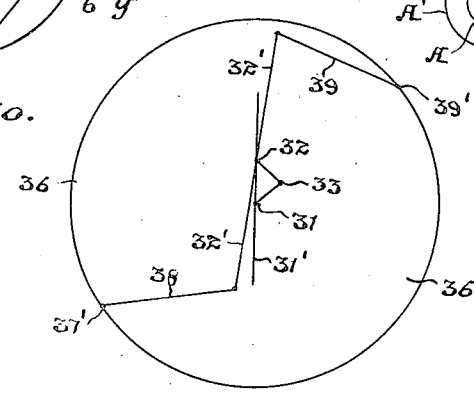

Patented Jan. 24, 1939

2,144,609

UNITED STATES PATENT OFFICE 2,144,609

VARIABLE SPEED AND MOTION TRANSMITTING MECHANISM

Frank Barber, Toronto, Ontario, Canada, assignor of one-fifth to Thomas G. Henderson, Toronto, Ontario, Canada Application November 22, 1935, Serial No. 51,011

21 Claims. (Cl. 74—118)

The invention relates to the mechanical transmission of power at variable speed ratios between a driving and a driven shaft and it is an important object of the invention to provide a mechanism for this purpose which will function smoothly and positively with the minimum of friction and relative motion of the parts and which will be easily controlled either at will or automatically to transmit power from the driving shaft to the driven shaft at any desired ratio from zero to direct drive.

A further and very important object is to provide a mechanism which has uniformity of output speed for any certain speed ratio which may be chosen, that is, in which the velocity of the driven shaft relative to the driving shaft throughout each revolution is, for all practical purposes, uniform.

The principal features of the invention reside in the novel construction, motional relation and relativity of parts whereby the rotary motion of the driving shaft is modified and translated into uniform straight line motion on radially oscillating members carried on a rotatable frame which imparts a rotary motion to said oscillating members in addition to their radial straight line motion, thence by intermittent clutch devices to impart consecutively smooth uniform driving impulses to the driven shaft at a speed always proportional to the speed of operation of the driving shaft.

In the drawings,

Figure 1 is a mid-sectional elevational view of a variable ratio power transmitting mechanism constructed in accordance with the present invention.

Figures 8 to 13 illustrate diagrammatically principles of motion translation referred to or employed in connection with the present invention.

Figures 8a and 9a are graphs illustrating respectively the wide divergence in one case and the comparatively slight divergence in the other case from relative uniformity of motion of the reciprocating points of the two devices illustrated respectively in Figures 8 and 9.

Figure 2:
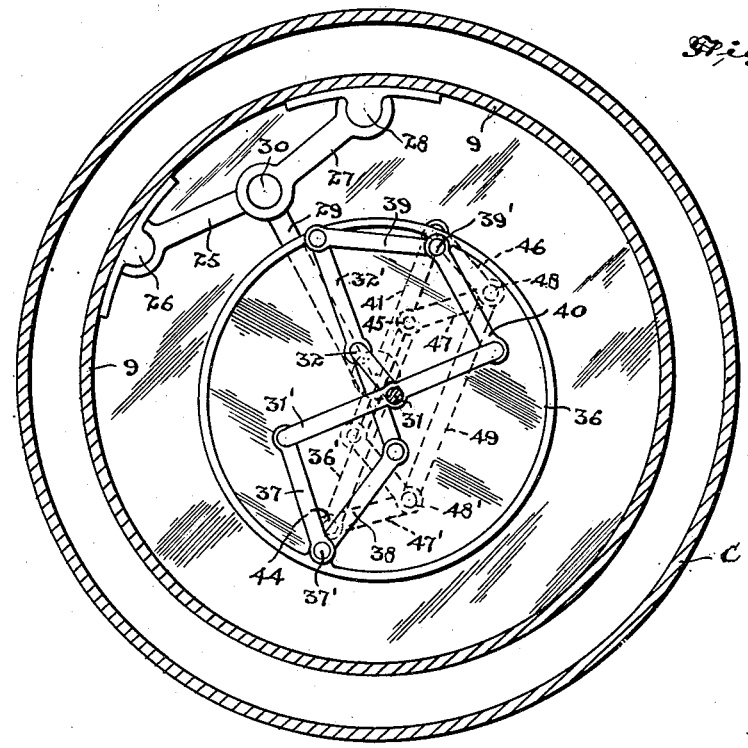
Figure 2 is a sectional end elevation on the line 2—2 of Figure 1 illustrating parts of the "left" mechanism, this figure being on a slightly reduced scale.

Many forms of power transmisison mechanism have been proposed in which intermittent clutch devices operated by the driving shaft were utilized to propel the driven shaft at a selected speed ratio. However careful analysis of these known structures shows that no attempt was made to maintain an absolute uniformity of motion of the driven shaft relative to the driving shaft and the motion of the driven shaft was uneven and jerky, since the clutch members driving same did not have a uniformity of motion throughout their entire stroke, resulting in the movement of the driven shaft in a pulsating manner alternately fast and slow during each revolution thereof, causing considerable vibration and strain on the operating parts with the resultant loss in power.

Further, due to the non-uniformity of motion of the driven shaft relative to the driving shaft, the scope of usefulness of the known mechanisms is greatly restricted and the rapidity with which the clutch elements and associated parts were called upon to operate, not only increased the tendency to vibration, but resulted in considerable friction and wear between the parts, causing rapid depreciation and the present invention effectively overcomes these objections.

In the form of the invention illustrated, the driving and driven shafts A and B respectively, are coaxially supported in the frame or casing C and a frame structure D comprising spaced end sections 1 and 2 rigidly connected by the sleeve or cylinder 3, is rotatably mounted in bearings 4 for rotation relative to and concentric with the driven shaft B. The end section 1 carries a shaft extension 5 concentric with the driven shaft B and extending toward the driving shaft A and terminating short thereof and a sleeve shaft A' concentrically encircles the shaft extension 5, spaced bearings 6 being interposed between the tubular shaft A' and the shaft extension 5, and a bearing 7 encircles the left-hand end of the sleeve A' and rotatably supports the same from the frame bracket 8.

A drive disc 9 carried by the driving shaft A and a drive disc 10 is rigidly secured to the sleeve shaft A' and spaced axially a suitable distance from the drive disc 9 and between these discs the "left-hand mechanism" is located, the function of which will be hereinafter pointed out and is for the purpose of effecting a slight relative difference in the rotational speeds of the drive shaft A and the tubular shaft A', for a purpose which will be hereinafter pointed out.

A variable eccentric member E encircles the shaft extension 5 closely adjacent to the end member 1 of the rotating frame D and while any suitable means may be provided for adjusting this variable eccentric from a concentric position with the shaft to any desirable eccentric relation with such shaft, I have shown a particularly suitable means for this purpose which will be hereinafter referred to.

The inner ends of the driven shaft B is here shown journalled at 11 in the end member 1 of the rotating frame D and its concentric relation with the shaft extension 5, so that the inner end of the shaft B will thus be firmly supported and yet be capable of rotation at a speed different from that of the rotatable frame D for a purpose which will hereinafter appear.

A flanged clutch hub F encircles and is rigidly attached to the driven shaft B and a mating clutch hub G of similarly flanged form is rotatably supported on the driven shaft B by the spaced bearings 12 and 13 and is spaced axially a suitable distance from the clutch hub F and provision is made according to the present invention to impart rotation to the clutch hub G relative to the driven shaft B and in the same direction, this relative rotation being effected by any suitable mechanism coupled with the driven shaft and a suitable mechanism for this purpose is shown at the right-hand end of Figure 1 and referred to hereinafter as the "right-hand mechanism", which mechanism is similar in many respects to the "left-hand mechanism" and these mechanisms will be referred to hereinafter in greater detail and while they form with the mechanism a highly desirable combination, they nevertheless have in themselves a wide field of application which is not restricted to the present invention and for this reason may form the basis for a separate application.

The clutch hubs F and G are located within the rotating frame D and paired clutch rings 14 and 14' are arranged in concentrically spaced relation on the outer sides of the clutch hubs F and G, the clutch rings 14 being disposed on the outward side of the hub flange, while the rings 14' are disposed on the inward side of the hub flange.

A corresponding set of paired clutch rings 15 and 15' are concentrically disposed between the clutch hubs F and G with the clutch ring 15 concentrically encircling the outer periphery of the respective clutch hub flanges and the clutch rings 15' concentrically fitting within the said flanges. All of the clutch rings are here shown as having clutch balls or the like of the type commonly used in free wheel clutches disposed to form a clutching contact between the ring and the flanges of the hubs when the rings and flanges are relatively moved in one direction, and to permit free rotation of the clutch rings relative to the hubs when the rings and hubs are relatively moved in the opposite direction.

According to the present invention the clutching faces of the clutch element F are arranged in reverse relation to the clutch faces of the clutch element G.

Hinge bolts are oscillatably mounted in pairs 16 and 16', and 17 and 17' respectively, on the rotating frame D, the hinge bolt 17 being shown as tubular and telescoped by the hinge bolt 16, and the bolts 16' and 17' are shown as diametrically opposed on opposite sides of the driven shaft B with the telescoped hinge bolts 16 and 17 spaced circumferentially of the frame D approximately 90°.

Paired arms 16'' are rigidly secured to the outer ends of the hinge bolts 16 and 16' and extend therefrom in substantial parallel relation and corresponding paired arms 17'' are rigidly secured to the outer ends of the hinge bolts 17 and 17' and extend in substantial parallel relation therefrom. The hinge bolts with their rigid extending arms thus form substantial U-bolts.

The hinge bolts 16—17 are shown telescoped for illustration purposes, and it is to be understood that the axes of bolts 16—17—16'—17' will be accurately located with respect to each other and to the frame as a controlling factor in the operation of the frames H and I.

A pair of floating frames H and I are arranged within the rotatable frame D and intersect each other in substantially right-angular relation. Each of the frame members H and I comprises spaced end members 18 and 19 respectively which extend in a substantial radial relation to the shaft B and are provided with radially extending slots of greater width than the diameter of the shaft B in order to permit floating or oscillating movement of the frames relative to the shaft in a direction longitudinally and transversely of the end members 18 and 19.

The outer ends of the U-bolt bars 16'' are pivotally connected to the respective ends of the floating frame H and the outer ends of the U-bolt bars 17'' are pivotally connected to the opposite ends of the floating frame I and in this way both the frames are oscillatably mounted on the rotatable frame D and they receive the oscillations from the eccentric E as follows. A ring H' is rotatably mounted concentrically of the eccentric ring E and is directly connected in a pivotal manner to the frame H at the point of pivotal connection of one of the arms 16'' therewith and a second ring I' is rotatably mounted on the ring H' for slight oscillating movement thereabout and is directly connected in a pivotal manner to the frame I at the point of connection of one of the arms 17'' therewith, the latter point of connection with the frame I being preferably disposed at an angle of approximately 90° about the axis of the shaft B from the point of connection of the ring H' with the frame H, these points of connection with the frames H and I being indicated respectively on Figure 6 as $h$ and $i$.

Cross bars 20 rigidly connect the respective end of the end bars 18 and 19 of the frames H and I.

Pivotal links 21 connect one end of the frame H with the clutch rings 14 of the clutch members F and G respectively and corresponding pivotal links 22 connect the other end of the frame H with the clutch rings 14' respectively.

A link 23 connects the cross bar of one end of the frame I with the two clutch rings 15 of the clutch members F and G respectively and a corresponding pivotal link 24 connects the other bar 20 of the frame I with the two clutch rings 15' of the clutch elements F and G respectively.

All of the pivotal links 21, 22, 23 and 24 are of uniform length and they all have their points of pivotal connection with the clutch rings at a uniform distance from the axis of the driven shaft B and it is important to note that according to the present invention the manner of oscillatably mounting the frames H and I and the manner of connecting these with the clutch rings is accurately chosen so that there will be a direct and uniform relation between the movement of the frames H and I and the resultant rotation of the shaft B, so that a uniformly continuous forward movement of the driven shaft will be achieved by the progressive operation of the clutches, thereby avoiding jerky or pulsating movements of the driven shaft as has been experienced in clutch transmissions previously proposed.

In Figure 8 with its accompanying graph, I have indicated diagrammatically an example of an objectionable construction such as commonly employed showing the wide divergence from uniformity of motion of the two connected points $a$ and $b$, the point $a$ being caused to travel either on the straight line $x$—$y$ passing through the centre of the clutch or on a curved line substantially tangent therewith. This wide divergence from uniformity of motion is clearly illustrated in the graph.

I propose to overcome this objectionable error or divergence from uniformity by introducing a mechanism which, as diagrammatically illustrated in Figure 9a, comprises the spacing of the straight line $x$—$y$ an accurate predetermined distance from the centre $c$ and in so doing I am able to reduce this divergence from uniformity of the points $a$ and $b$ to a practically negligible amount which is represented in an exaggerated manner in the graph in Figure 9 as diverging only slightly and in a balanced manner to either side of a straight line, or in other words speed ratio of $a$ and $b$ has been made equal at three points, namely the mid-position and near each end instead of at only two points as shown in the graph of Figure 8a.

Referring to Figure 9 I have found by careful computations that for the uniform results shown in the graph of Figure 9 the length of $d$ from centre $c$ to line $x$—$y$ may be 1.345 times the radius $r$ and that the length of the connecting link $l$ should then be 1.749 times the radius $r$, but other suitable ratios may be chosen within the spirit of the present invention.

It is probably unnecessary for most practical purposes to further reduce the slight deviation from absolute uniform or "straight line" motion, but if this should be found desirable for any purpose to which this mechanism might be applied, the application of further variables may readily be resorted to, as is indicated diagrammatically in Figure 10 where provision is made for altering the effectve length of the link $l$ by forming such link of pivotally connected sections which are moved laterally out of and into a straight line a sufficient amount only to maintain the desired predetermined or uniformity of motion of the points $a$ and $b$.

It will be understood that the above principle which I have evolved is not restricted to use in connection with the mechanism defined herein, but will be applicable in any motion-translating or modifying mechanism where it is either essential or desirable that two connected points, one moving in a straight line or the arc of a circle and the other moving in the arc of a circle of different radius, will move at a uniform or substantially uniform ratio of velocity throughout a definite length of their travel. This uniformity distinguishes from other known "straight line motions".

Figure 3:
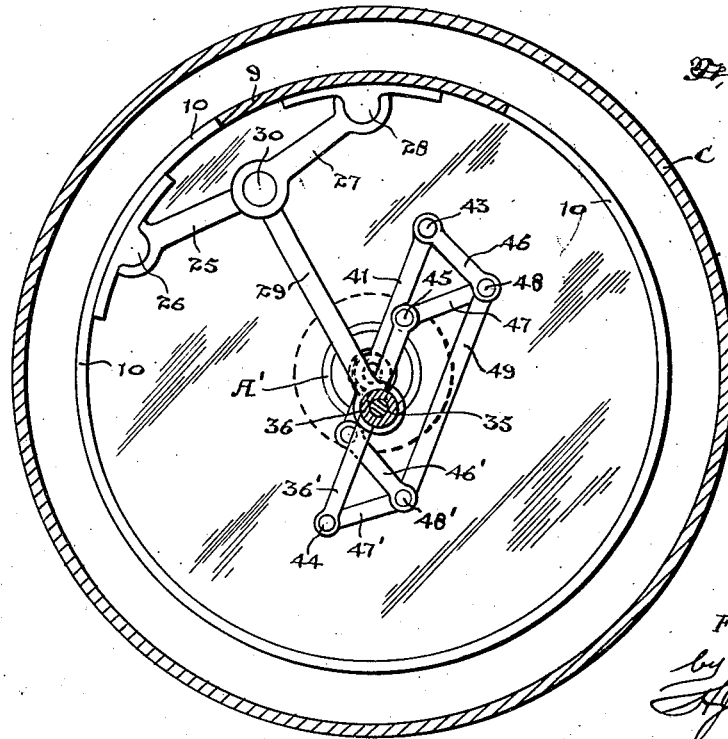
Figure 3 is a sectional end elevation of the "left" mechanism taken on the line 3—3 of Figure 1.
Figure 4:
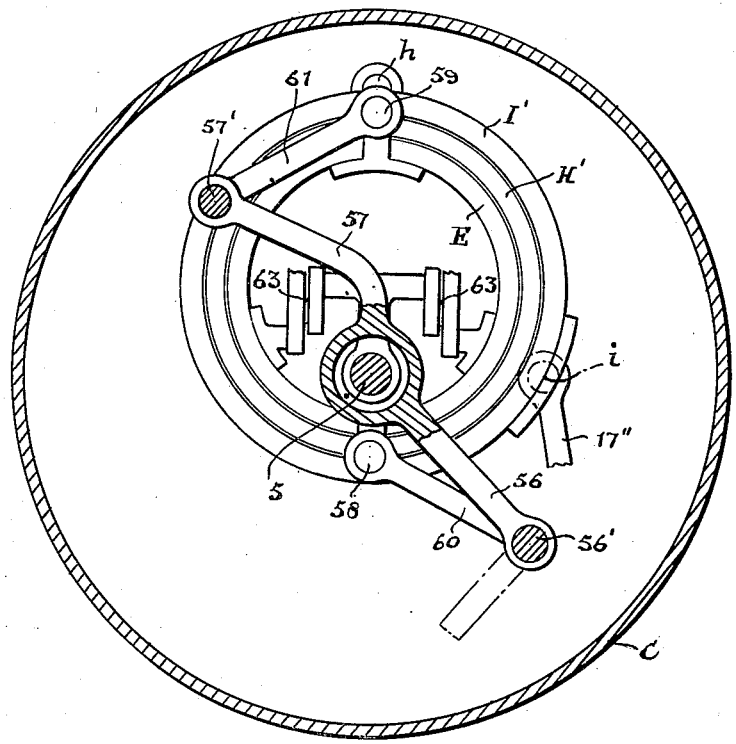
Figure 4 is a cross sectional view taken on the line 4—4 of Figure 1, showing the adjustable eccentric and related parts.
Figure 5:
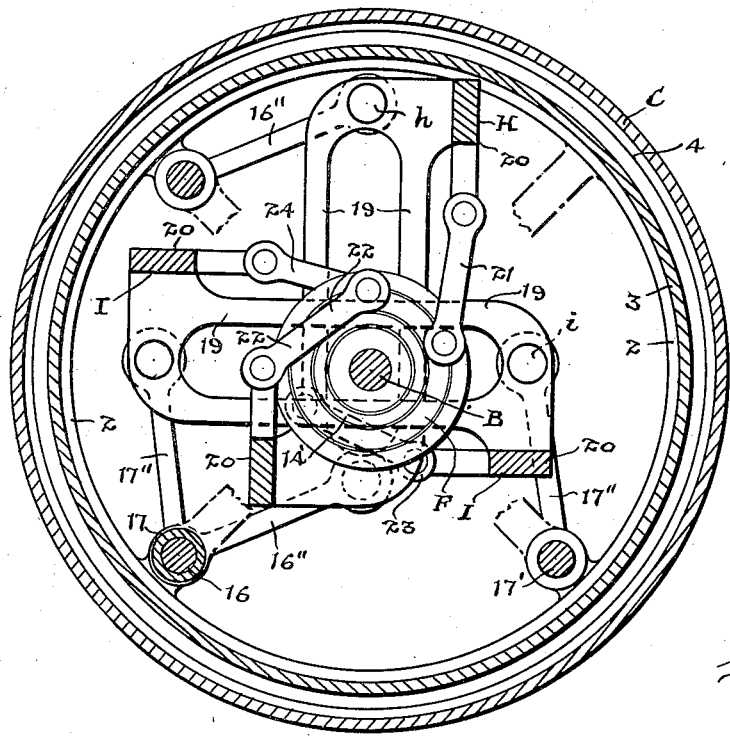
Figure 5 is a transverse section taken on the line 5—5, Figure 1, showing the rotatable frame and reciprocable clutch elements carried thereby and forming part of the "central" system.

Referring now to the "left-hand" mechanism, the function of which is to alter the relative speeds of the discs 9 and 10, causing disc 10 to rotate alternately faster and slower than the disc 9, this will now be defined, the principle of operation of this "left-hand" mechanism being diagrammatically illustrated in Figures 11 and 12 and structurally in Figures 1, 2 and 3.

A link 25 is pivoted at one end to the disc 10 at the point 26 and a similar link 27 is pivotally connected at one end with the drive disc 9 at the point 28 and the free ends of the links 25 and 27 are pivotally connected together to form a break joint or toggle and an operating member 29 extends from the pivotal connecting joint 30 in a substantial radial direction.

The driving shaft A carries a double crank 31 and 32 and arms 31' and 32' are mounted thereon respectively to revolve thereabout. The crank 32 and the shaft extension 5 carry pin projections 33 and 34 respectively in axial alignment and a U-crank 35 is journalled on the pin projections 33 and 34 so that it may rotate about the common axis of the drive shaft A and shaft extension 5.

A disc 36 is rotatably journalled on the U-crank member and the inner end of the arm 29 is rotatably journalled about the hub of the disc 36 and the said disc hub carries a diametrically disposed arm 36'. The ends of the arms 31' and 32' are connected by the links 37, 38, 39 and 40, the links 37 and 38 being pivotally connected together at 37', and the links 39 and 40 being pivotally connected together at 39'.

The shaft extension 5 carries a diametrically disposed arm 41 having crank ends 42 and 43 spaced different distances from the axis and the arm 36' carries cranks 44 and 45 offset a suitable distance from the axis of the hub 36 and the cranks 43 and 45 are connected by the pivotal links 46 and 47, which links are of uniform length and connected together at 48 and the cranks 42 and 44 are connected together by the links 46' and 47', which links are also of equal length and connected together at the points 48' and a bar 49 is pivotally linked at the ends to the points 48 and 48', so that parallelograms are formed by the members so connected. Thus the arms 36' and 41 and the link or connecting arm 49 always remain parallel so that the arm 36' is made to revolve by reason of its connection with arm 41 carried by the shaft extension 5 and at the same velocity as such shaft. This rotation of the arm 36' is independent of its rotation as a unit about the pin projections 33 and 34.

The result of this assembly of elements in the "left-hand mechanism" is to maintain a predetermined rotative relation between the driving shaft A and the eccentric E and the elements which such eccentric displaces regardless of the degree of its eccentric relation with the shaft 5, so that for a given motion of shaft A there will be a modified resultant motion of the eccentric E and of the elements actuated thereby. This is best illustrated in the diagrammatic showing, Figure 13, where $r$ represents the variable radius or eccentric. Referring to this diagram, it will be apparent that without the use of the "left-hand mechanism" defined the point b' will move at the exact speed of the driving shaft, or rather with the same angular velocity and assuming this velocity to be constant, it will be readily seen that the point b'' moving on the line x'—y' will be moved at an irregular velocity which will constantly change in relation to the angular velocity of the point b'. However, by incorporating my motion-control mechanism or the equivalent referred to as the "left-hand mechanism", the motion or angular velocity of point b' may be made to substantially harmonize with the linear velocity of the point b'' so that there will be such a speed relationship between these two points as to cause uniformity of speed between b'' and shaft A.

The "right-hand mechanism" shown at the right of Figure 1 is an adaptation of the principle employed in the "left-hand mechanism" defined except that the disc 36'' corresponding to the disc 36, is rotatably journalled on the bearings 50 in the casing C and in eccentric relation to the axis of the driven shaft B and link elements 51, 52 and 51' and 52' corresponding with the links 46, 47, 46' and 47' of the "left" mechanism and a connecting member 49' is provided for these sets of links corresponding to the member 49 of the "left" mechanism.

The clutch hub G has a sleeve extension 53 which rotatably encircles the driven shaft B and extends to the support bearing 13 and this sleeve extension carries a diametrically arranged arm 54 having crank ends 55 and 56 respectively connected with the toggle links 51 and 51'. The effect of the "right-hand mechanism" is to rotate the clutch hub G at a forward speed directly proportional to the speed of the driven shaft and in the case illustrated the mechanism shown will rotate the clutch element G at one-half the speed of the driven shaft B and in the same direction for a purpose to be later described.

The operation of the mechanism in transmitting power from the driving shaft to the driven shaft will now be defined.

Assuming the driving shaft A to be rotating at a constant speed for the purpose of this description, the eccentric E will be rotated at the same number of revolutions as the driving shaft, but with a motion which has been modified by the "left-hand mechanism". Due to the pivotal connections of the eccentric rings H' and I' with the oscillatable frames H and I at the points h and i, the rotation of the eccentric E will cause the frames H and I to be oscillated with progressively similar motions on their U-bolt mounting so that the clutch rings of the clutch hub F will be progressively oscillated and assuming that the rotatable frame D was held, this oscillation of the clutch rings of member F would cause the rotation of the driven shaft B and assuming that the throw of the eccentric E was such as to cause the reciprocation of each clutch ring one quadrant, then the rotation of the shaft B would be one revolution for one revolution of the driving shaft A.

However, since the rotation of the driven shaft B acting through the "right-hand mechanism" also effects the forward rotation of the other clutch element G at a speed one-half that of the shaft B, the result will be that this forward half revolution of G relative to the shaft B imparts a corresponding forward rotative thrust to the rotatable frame D through the medium of the clutch rings of the driven member G and the link connections therewith and the oscillating frames, since, as previously pointed out, the clutch members on the element G are arranged in reverse relation to the clutch elements on member F.

However, the presence of the reversely arranged clutch element G and the clutching elements thereof connected with the oscillating frames will have a further additional rotative effect on the frame D, since the clutch rings of the member G in being actuated by the oscillations of the frames H and I will meet the opposition of the forwardly rotating clutch element G and since this element cannot be turned backwardly thereby, there will be a directly opposite resultant thrust applied to the rotatable frame D which will be in addition to the direct rotation imparted thereto through the said rotation of the element G, so that the cumulative effect will be to rotate the frame D in a forward direction at a speed which will be three quarters that of the driven shaft B.

It will be readily appreciated that this forward rotation of the frame D at a speed three quarters that of the driven shaft and in the same direction as the direction of rotation of the eccentric E, will have the effect of reducing to a very considerable extent the rate of oscillation of all the members, while at the same time the speed ratio between the driving shaft A and driven shaft B will be uniformly constant and directly proportional to each other at all times for any chosen degree of eccentricity of the driving eccentric E, so that the action is smooth, powerful and devoid of objectionable vibration.

The eccentric E and associated elements are shown in the drawings as positioned for the maximum ratio, namely unity, that is, for direct drive.

Since the rotatable frame D is rotated in a forward direction at a constant ratio of three quarters of the speed of the driven shaft B nad since in the position of the parts shown in Figure 1, the driven shaft is rotated at the same speed as the driving shaft, it will be seen that for each revolution of the driving shaft A such shaft will be rotating at one quarter revolution faster than the rotatable frame D and the shaft extension 5, so that accordingly the eccentric E will, in the position shown, gain a quarter revolution over the frame D and its associated parts for each forward revolution of such frame, so that before a complete revolution of the eccentric takes place relative to the rotating frame D, the eccentric must rotate four complete revolutions. Heretofore when an eccentric actuated an intermittent clutch such eccentric invariably displaced the clutch one complete range for a half-revolution of the eccentric, whereas according to the present invention the eccentric is permitted to make more than one-half revolution during each driving "range" of each clutch device. Or according to the specific constructional example, illustrated and described herein, it may be said that the eccentric is caused to rotate four revolutions for each driving "range" of each clutch device, which is to say that four revolutions are required of the eccentric to move each clutch through one driving range and return it to the commencement of its next driving range. It thus follows that the eccentric will have a "soft" action on the clutching devices so that the full range of any one clutching device will be expended in a gradual manner, as the eccentric operating at a slightly greater rate continues to gradually over-run the slower rotation of the rotating frame D and there will be no jerky or violent clutching impulses such as would be experienced if the oscillating clutching devices were simply mounted on a rigid frame and did not rotate in a thrust-relieving manner as defined.

However, since the eccentric itself is capable of adjustment from a position concentric with the shaft 5 to the maximum eccentric position shown, it necessarily follows that the speed relationship between the drive shaft A and the rotating frame D may be correspondingly altered to any desired value, but due to the mechanism defined the speed relationship of the driven shaft B and the rotating frame D will always remain constant. Provision may be made however in certain cases for altering the speed relationship between the driven shaft B and the rotatable clutch element G or frame D and I have simply shown in the "right-hand mechanism" a suitable arrangement which will drive the element G at one half the speed of the driven shaft B as the present invention is not to be construed as limited to the use of the special "left-hand" and "right-hand" mechanisms shown and described, since it is clearly within the scope of invention to substitute any other suitable motion-translating devices in place thereof which will perform the desired function.

The "left" and "right" mechanisms defined are desirable in that the motion translations and relative speeds produced are achieved solely by link and pin devices with crank displacement means or the equivalent and there are no gears or frictional sliding surfaces.

Since the "left" mechanism is shown herein influentially interposed between the driving shaft A and the shaft extension 5 and since the speed of the drive shaft A relative to the shaft 5 will vary with each particular setting of the eccentric E, it will be seen that the "left" mechanism will function to rotate the U-crank 35 at a velocity as much slower than that of shaft 5 as the velocity of shaft A is faster, so that the motion of the disc 10 relative to the disc 9 and consequently the motion of the eccentric connected with the disc 10 will be modified to move alternately faster and slower during each "range", that is, during each quadrant advance of the eccentric over the rotatable frame D, irrespective of the relative speeds of A and 5. This is the motion-correcting feature referred to in connection with the diagram in Figure 13 so that points $b''$ and $b'$ will be made to travel with uniform velocity throughout their complete range of movement.

As previously pointed out, any suitable means may be provided for adjusting the eccentric E and holding same positively in its adjusted position and while the particular adjusting means shown herein is especially suitable, it does not form an essential part of the present invention and may be briefly referred to as follows:—Arms 56 and 57 are rigidly secured to the inner end of the hollow driving shaft A' and have pivot points 56' and 57' respectively at their outer ends arranged in diametrically opposite relation to the axis of shaft 5.

Pivot pins 58 and 59 are carried by the eccentric ring E at diametrically opposite points and in a plane disposed at an angle about the shaft axis of approximately 45° to the plane of disposition of the pivot points 56' and 57' and supporting links 60 and 61 connect the arm pivots 56' and 57' respectively with the eccentric ring pivots 58 and 59.

A sleeve member 62 concentrically encircles the drive shaft sleeve A' and is supported clear of actual contact therewith by a special parallel link motion device indicated in general by the letter J, which mechanism may be actuated in any suitable manner either automatically or manually to shift the sleeve 62 axially of the drive sleeve A', and a link mechanism 63 pivotally associated with the sleeve 62 and the eccentric ring E is provided for transforming the axial displacement of the sleeve 62 to a radial displacement of the eccentric E and a counterbalanced ring E' is hung from the pivot points 56' and 57' of the arms 56 and 57 and operated in unison with the adjusting movement of the eccentric E by means of a link mechanism 64, so that the counterbalance E' will be moved radially to one side of the shaft A' while the eccentric is being adjusted to the opposite side so that a substantial balance will be maintained regardless of the adjustment of the eccentric and its associated parts.

Uniformity of relative velocity throughout each said range requires that the motion (assumed to be uniform) of a point moving completely about a circle of variable radius impelled by the driving shaft, can be translated into uniform motion of a reciprocating point oscillating on the arc of a circle of fixed radius.

Now it has been proved by mathematicians that this cannot be effected with mathematical exactitude by circular wheels or by links pinned together or with ends sliding on straight beds, or by a combination of both; this would be equivalent to "squaring the circle". It can be accomplished with theoretical precision (with the above means) only by actually developing the circle; e. g. by the chain, belt or other friction device.

However, I have investigated this problem and I find that it can be achieved practically and to any required degree of accuracy by the following method which is an important underlying principle of the present invention.

The motion of the driving shaft is first transmitted to a second shaft which makes the same number of revolutions but whose motion has been modified so that it is alternately quickened and retarded in each "range". The point moving on the circle of variable radius is impelled by, and with the modified speed of, the second shaft A'. The motion of this point is then translated to the motion of a reciprocating point oscillating on a straight line with uniform velocity within its range. This said modification and translation may be designated the "direct movement". The uniform motion of the point on the straight line is then translated to the motion of the point oscillating on the arc of the fixed circle and with uniform motion within its range.

Figure 14:
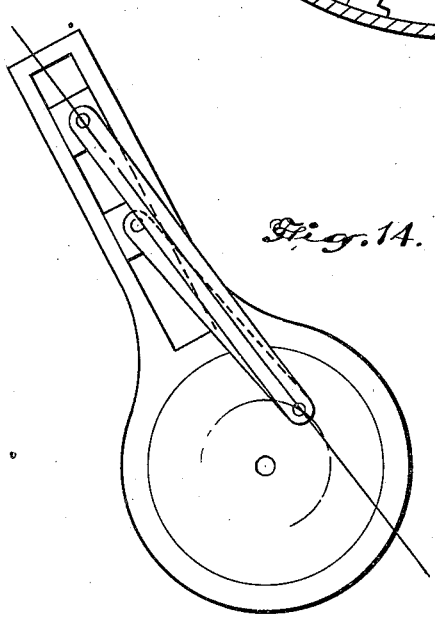
Figures 14 and 15 are diagrammatic showings of principles referred to in connection with the present invention.

The quickened and retarded motion may be imparted to the said second shaft A' in various ways, e. g., by a modification of Whitworth's "quick return" device as shown in Figure 14, but this modification of motion is made preferably without employing sliding parts as in the "left mechanism" of Figure 1. Here the relative lengths of the links may be found by computation so as to cause oscillations of the definite required amplitude and character, namely, such that the resolved part of the motion of $b'$, Figure 13, in the direction $x'-y'$ is a constant ratio of the angular motion of the driving shaft B. Thus this resolved part of the motion of $b'$ is uniform, although the angular motion of $b'$ as modified, is not. This result is of course independent of the radius of $r$.

Figure 15:
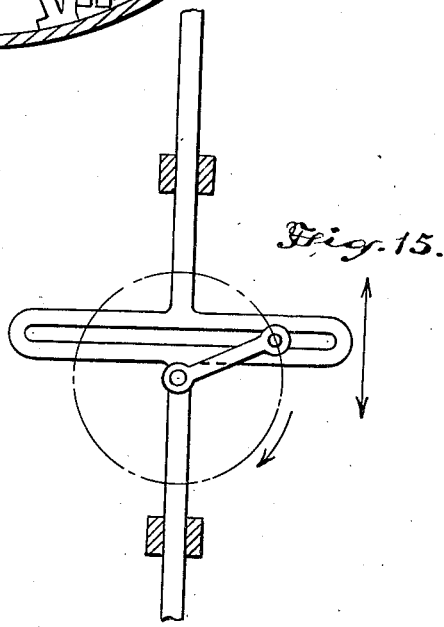

This resolved part of the motion of $b'$ may be exactly transferred to $b''$, which represents the point moving on the said straight line (i. e. $x'-y'$) by the device shown in Figure 15, but this is preferably accomplished without sliding parts as in the mechanism detailed in Figure 1 and associated views. The latter device is more simply illustrated in Figure 13 in which a link $l$ directly connects $b'$ and $b''$, and $b''$ of Figure 13 corresponds to or represents, the pins $h$ and $i$ and also the pins connecting the links 21, 22, 23 and 24 with the frame H and I of Figure 8, and the link $l$, Figure 13, represents the fixed distance between each of these pins and the centre of the variable eccentric E, which centre is represented in Figure 13 by $b'$.

Figure 6:
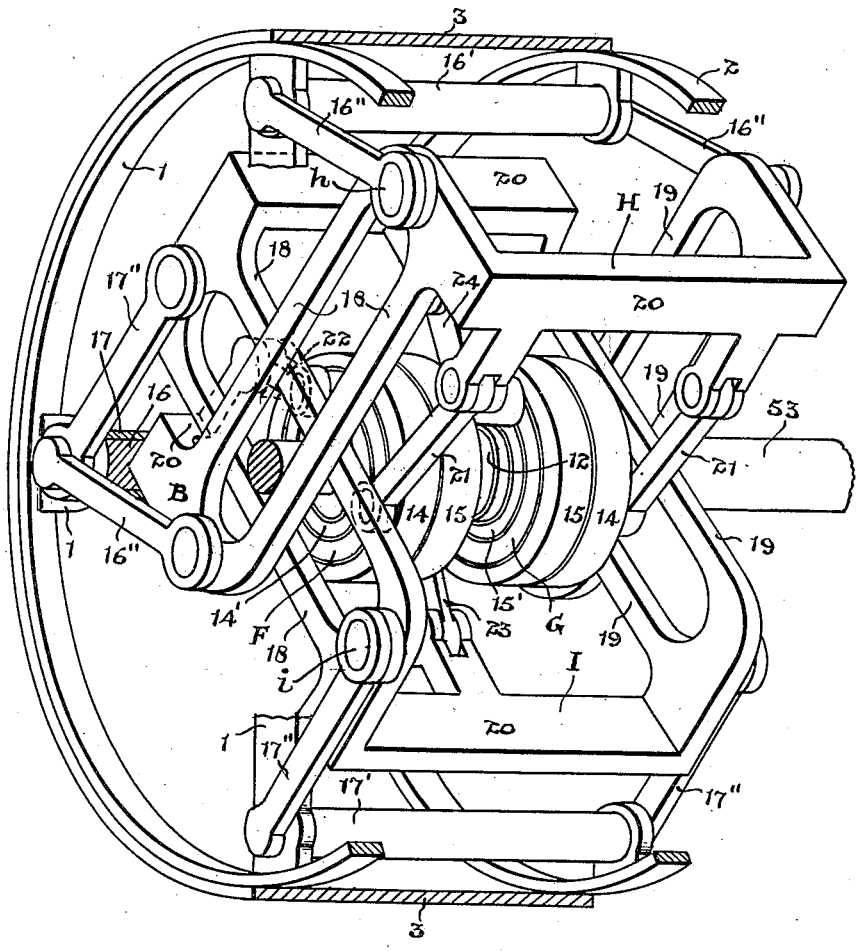
Figure 6 is an enlarged perspective view broken away in part, of the mechanism shown in Figure 5.
Figure 7:
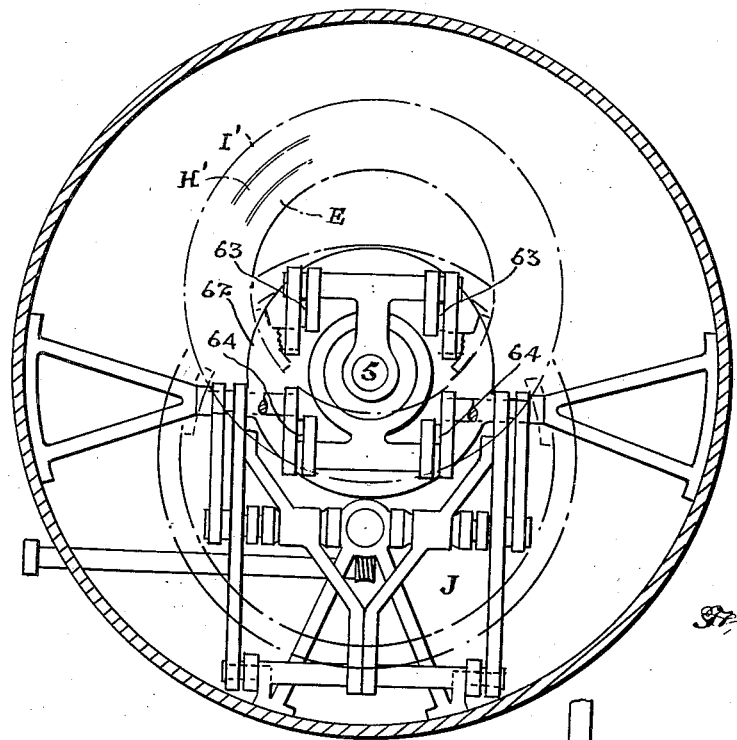
Figure 7 is a cross section taken on the line 7—7, Figure 1, in the direction indicated by the arrows.

The deviation from speed uniformity between the said resolved part of the velocity of $b'$, Figure 13 and the velocity of $b''$, Figure 13, caused by the varying inclination of the link $l$ to the straight line $x'-y'$, Figure 13 is offset by the effect of the U-bolt links 16'' and 17'', Figure 6 in deflecting the pins $h$ and $i$ from the straight lines extending from $h$ and $i$ through the axis of the frame D. The position and lengths of these U-bolt links 16'' and 17'' can be selected so as to practically balance the said deviation.

The fact that the straight lines between $h$ and $i$ and the centre of rotative frame D (represented by the straight line $x'-y'$ in Figure 13) also rotate uniformly, does not alter the principle of these straight line motions nor affect the accuracy of the result.

The structure defined is capable of many variations and adaptations and will function at any speed ratio from zero to unity with an output velocity which is constantly and progressively uniform in relation to the input velocity and for this reason it is applicable for use where extreme accuracy and uniformity of relation between input and output motions are essential or desirable, one example of this being as a speed change device for lathes for screw-cutting or feed purposes.

I therefore do not limit myself to the exact structure shown, since this may be modified to a considerable extent without departing from the essential features of the invention.

While I have defined the illustrated mechanism as comprising a variable ratio transmission in which the power input is applied through the shaft A and the power output taken from the shaft B, the invention is not to be construed as restricted in this sense, since it is quite within the scope of the invention to vary the point of power input and power output and to make any minor changes in the location, operation or control of the various operating elements which may be desirable, depending on the use to which the mechanism is to be put.

What I claim as my invention is:—

1. In a power transmitting mechanism, driving and driven shafts, said driving shaft having relatively rotatable portions, and means including intermittent clutch devices interposed between said driving and driven shafts for rotating said driven shaft at a constant uniform velocity relative to said driving shaft, said means also including hinged link members forming a combined power and control connection between said relatively rotatable shaft portions, and means for operating said hinged links to cause said respective shaft portions to rotate alternately faster and slower relative to each other.

2. In a power transmitting mechanism, driving and driven shafts, said driving shaft having relatively rotatable portions, and means including intermittent clutch devices interposed between said driving and driven shafts for rotating said driven shaft at a constant uniform velocity relative to said driving shaft, said means also including hinged link members forming a control connection between said relatively rotatable shaft portions, and means including crank means operating about the center line of the driving shaft and operatively connected with said links to operate one portion of the drive shaft alternately faster and slower than the other portion.

3. In a power transmitting mechanism, a divided driving shaft and a driven shaft, intermittent clutch devices each concentrically encircling the axis of the driven shaft and each having a one-way drive connection therewith, and means operatively connected with said divided driving shaft for operating said intermittent clutch devices progressively with a motion which is uniformly constant throughout each driving range to thereby avoid pulsating or jerky operation of the driven shaft and maintain a uniform velocity of the driven shaft relative to the driving shaft throughout each revolution of the driven shaft, said means including crank pins carried respectively by the divided portions of said driving shaft, links connected one with each of said respective crank pins, and having a common hinge connection disposed intermediately between said cranks and displaceable to opposite sides of a plane extending through said cranks, and means connected with said links for displacing said hinge connection alternately back and forth across said crank connecting plane, whereby for each full one-way displacement stroke of the said hinge, the said respective cranks will be relatively displaced angularly in consecutively opposite directions to effect a corresponding increase and decrease in the rate of operation of said clutch-operating means.

4. Means as claimed in claim 3 in which said first mentioned means includes an eccentric actuated by the divided driving shaft through said hinged control links, and the means for displacing the hinge connection of said links includes a link extending inwardly from the hinge connection thereof and operated by a crank member, means being provided for operating the crank member at a rate in synchronism with each driving range.

5. In a power transmitting mechanism, driving and driven shafts, clutch means mounted on the driven shaft having one way clutch elements co-operating therewith, a frame rotatable concentrically of the driven shaft, frame members oscillatably mounted in said rotatable frame, means operatively connecting said frame members with said one way clutch elements, an eccentric actuated by the driving shaft, means operatively connecting said eccentric with said oscillatable frame members to oscillate the same relative to the rotatable frame, and means for rotating said frame at a speed less than the speed of rotation of said eccentric whereby the rate of oscillation of the oscillatable frames is reduced relative to the rate of rotation of the eccentric operating same so that a smooth and prolonged clutching action is achieved.

6. Means as claimed in claim 5 in which said eccentric is adjustable to any degree of eccentricity from zero to maximum, and means is provided for periodically altering the relative speeds of the driving shaft and eccentric during each full driving range of the clutch devices, and at a rate proportional to the difference in speeds of operation of the driving shaft and said rotatable frame.

7. In a power transmitting mechanism, driving and driven shafts, a clutch drum fixed to said driven shaft, a second clutch drum rotatable relative to the aforesaid drum, clutch elements oscillatably associated with said respective drums, the clutch elements of one drum being disposed in reverse clutching relation to the clutch elements of the other drum, a frame rotatable about the driven shaft axis relative to said drums, oscillatable members, means oscillatably supporting said oscillatable member in said rotatable frame, means co-operatively linking each of said oscillatable members to a clutch element of each of said clutch drums, means for rotating said rotatable clutch drum at a predetermined speed relative to the driven shaft, and means connected with the driving shaft for oscillating said oscillatable frames relative to the rotatable frame.

8. Means as claimed in claim 5 in which said eccentric is adjustable to any degree of eccentricity from zero to maximum, and means is provided for periodically altering the relative speeds of the driving shaft and eccentric during each full driving range of the clutch devices, and at a rate proportional to the difference in speeds of operation of the driving shaft and said rotatable frame, said latter means including a break-joint toggle link device forming an operative drive connection between the driving shaft and eccentric with means for periodically displacing the joint to alter the effective length of the drive connection whereby the relative speeds of the driving shaft and eccentric are altered.

9. Means as claimed in claim 5 in which said eccentric is adjustable to any degree of eccentricity from zero to maximum, and means is provided for periodically altering the relative speeds of the driving shaft and eccentric during each full driving range of the clutch devices, and at a rate proportional to the difference in speeds of operation of the driving shaft and said rotatable frame, said latter means comprising a double crank device having intersecting arms connected by toggle jointed links, the toggle joints of said links being connected to a member which is rotatable about its own centre and mounted for rotation of its centre about the drive shaft axis, said latter rotatable member having toggle link connections with the rotatable frame, and means actuated by the displacement of the said rotatable member for effecting the periodic alteration of the relative speeds of the driving shaft and eccentric.

10. Means as claimed in claim 7 in which said means for effecting rotation of the rotatable frame comprises a double crank on the driven shaft having intersecting arms which are linked to points on a member which is mounted for rotation relative to the driven shaft, said latter member having operating connections with said rotatable clutch drum.

11. Means as claimed in claim 7 in which said means for effecting rotation of the rotatable frame comprises a double crank on the driven shaft having intersecting arms which are linked to points on a member which is mounted for rotation eccentrically of the driven shaft, said latter member having toggle-link driving connections with said rotatable clutch drum.

12. In a variable ratio motion transmitting mechanism, driving and driven shafts, variable ratio drive means connected with and forming an operative drive connection between said driving and driven shafts and maintaining a constantly uniform ratio of motion between said driving and driven shafts said means including in combination, intermittent one-way clutch devices, a variable throw crank operatively connected with the driving shaft and moving in a circular path of variable radius, said clutch devices having a common fixed center or axis and clutch portions oscillatable concentrically thereabout and having one-way driving clutch connections with the driven shaft, said clutch portions having pins which move therewith in an arc of a circle of fixed radius, links pivoted at one end on the said clutch pins, and motion transmitting means operated by said variable crank, and having a pin connection with the other end of each of said links and transforming the motion of the said crank into consecutive substantially straight line motions of the said pin connections of other ends of said links, and means for maintaining a fixed relative uniformity of motion between the substantially straight line motions of said second mentioned pins and the circular motions of the clutch pins linked thereto.

13. A variable ratio motion transmitting mechanism as claimed in claim 12, in which said motion transmitting means operated by the variable crank comprises displaceable frames which carry the pins of the outer ends of said links, and guide means for said frames for guiding the pins thereof in substantially straight line paths during displacement of said frames.

14. A variable ratio motion transmitting mechanism as claimed in claim 12, in which said motion transmitting means operated by the variable crank comprises displaceable frames mounted in right-angular intersecting relation to each other for relative displacement in directions at right angles to each other, and means for guiding said frames to maintain each frame parallel to a predetermined plane.

15. Means for translating uniform angular motions of a driving member through a variable ratio-intermittent clutch drive into uniform angular motion of a driven member, comprising a driving member adapted to operate with a uniform angular motion, a crank member of variable radius operated by said member, frame members displaceably mounted, means for translating the uniform angular motion of said driving member into uniform substantially straight line motions of said displaceable frames including motion modifying means interposed between the driving member and said variable radius crank for modifying the angular motion of the crank relative to the driving member, the degree of displacement of said frames being dependent on the degree of eccentricity of said variable crank means, a driven shaft, one-way clutch devices for rotating said shaft, means for consecutively translating the uniform substantially straight line motions of said frames into relatively uniform oscillatory motions of said one-way clutch devices comprising link and pin connections between said clutch devices and frames, the length of the effective arcs of oscillation of said clutch devices being directly proportional to the length of the effective stroke of said frames whereby the driven shaft is operated through said link and pin connections with a uniform angular motion at any speed relative to the driving shaft as determined by the setting of said variable crank means.

16. In a motion transmitting mechanism of the oscillating clutch type, driving and driven shafts, oscillating one-way clutches co-operating with the driven shaft, adjustable drive means interposed between said driving shaft and said one-way clutches capable of successively oscillating said clutches each a complete quadrant or greater for each quarter revolution of the driving shaft, whereby a direct one to one drive or greater may be established between said shafts, said means including means for maintaining uniformity of the driven shaft speed throughout each driving range of said clutches including operating links directly pivoted at one end to the oscillatable clutch members to oscillate therewith, and means for reciprocating the other ends of said links in controlled predetermined paths.

17. In a power transmitting mechanism, relatively rotatable driving and driven shafts and means for rotating said driven shaft at a constant uniform velocity relative to said driving shaft said means including in combination, an intermediate driving shaft rotatable relative to said driven shaft and adapted to rotate alternately faster and slower than said driving shaft, drive means including intermittent clutch devices operatively interposed between said intermediate driving shaft and said driven shaft, hinged link members forming a control connection between said driving and intermediate driving shafts, and means for operating said hinged links in predetermined timed relation to the rate of rotation of said driven shaft to alternately operate said intermediate shaft faster and slower than said driving shaft and compensating for variations from uniformity of drive encountered in said intermittent clutch devices.

18. In a power transmitting mechanism, driving and driven shafts, intermittently oscillatable clutch devices each disposed concentrically of the driven shaft and having one way clutching co-operation therewith, eccentric means operated by said driving shaft, displaceable clutch operating members forming drive connections between said eccentric means and clutch devices, and means for effecting a reduction of the frequency of oscillation of the intermittent clutch devices relative to the rate of rotation of said eccentric means including means co-operatively interposed between said driven shaft and clutch-operating members and operable to displace said clutch operating means relative to said eccentric means.

19. In a power transmitting mechanism, driving and driven shafts, intermittently oscillatable clutch devices each disposed concentrically of the driven shaft and having one way clutching co-operation therewith, eccentric means operated by said driving shaft, displaceable clutch operating members forming drive connections between said eccentric means and clutch devices, and means for effecting a reduction of the frequency of oscillation of the intermittent clutch devices relative to the rate of rotation of said eccentric means including means co-operatively interposed between said driven shaft and clutch-operating members for rotating the oscillatable members of the clutch devices concentrically of each other about the common axis of the driven shaft together with their operating members at a speed less than that of the eccentric means.

20. In a power transmitting mechanism, driving and driven shafts, intermittently oscillatable clutch devices each disposed concentrically of the driven shaft and having one way clutching co-operation therewith, eccentric means operated by said driving shaft, displaceable clutch operating members forming drive connections between said eccentric means and clutch devices, and means for effecting a reduction of the frequency of oscillation of the intermittent clutch devices relative to the rate of rotation of said eccentric means including a frame continuously rotatable about the axis of the driven shaft concentrically of the common axis of said clutches and at a rate of rotation slower than that of the eccentric and having the operating members of the clutch devices connected thereto for continuous displacement therewith, said operating members including frame members displaceably mounted in said rotatable frame and having link connections directly with the oscillatable members of said clutch devices.

21. In a power transmitting mechanism, driving and driven shafts, intermittently oscillatable clutch devices each disposed concentrically of the driven shaft and having one way clutching co-operation therewith, eccentric means operated by said driving shaft, displaceable clutch-operating members forming drive connections between said eccentric means and clutch devices, and means for effecting a reduction of the frequency of oscillation of the intermittent clutch devices relative to the rate of rotation of said eccentric means including a frame rotatable about the axis of the driven shaft concentrically of each of said clutch devices and having the operating members of the oscillatable clutch devices connected thereto for displacement therewith, and speed modifying means co-operatively interposed between said driven shaft and the rotatable frame for imparting rotary motion to said rotatable frame concentrically of each of said clutch devices.

FRANK BARBER.